US008161156B2

(12) United States Patent
McDysan et al.

(10) Patent No.: US 8,161,156 B2
(45) Date of Patent: Apr. 17, 2012

(54) FEATURE DELIVERY PACKETS FOR PEER-TO-PEER BASED FEATURE NETWORK

(75) Inventors: David E. McDysan, Great Falls, VA (US); Stevan H. Leiden, Norwood, MA (US); Douglas M. Pasko, Bridgewater, NJ (US); John E. Rathke, Southborough, MA (US)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 34 days.

(21) Appl. No.: 12/649,706

(22) Filed: Dec. 30, 2009

(65) Prior Publication Data

US 2011/0161494 A1    Jun. 30, 2011

(51) Int. Cl.
*G06F 15/173* (2006.01)
(52) U.S. Cl. .................... 709/225; 709/223; 709/224
(58) Field of Classification Search .......... 709/223, 709/224, 225
See application file for complete search history.

(56) References Cited

U.S. PATENT DOCUMENTS

| | | | |
|---|---|---|---|
| 2004/0030620 A1* | 2/2004 | Benjamin et al. | 705/32 |
| 2004/0128343 A1* | 7/2004 | Mayer | 709/203 |
| 2008/0177896 A1 | 7/2008 | Quinn et al. | 709/238 |
| 2008/0198849 A1 | 8/2008 | Guichard et al. | 370/392 |
| 2008/0205291 A1* | 8/2008 | Li et al. | 370/254 |
| 2008/0320303 A1 | 12/2008 | Khalid et al. | 713/163 |
| 2009/0037713 A1 | 2/2009 | Khalid et al. | 713/1 |

* cited by examiner

*Primary Examiner* — Adnan Mirza

(57) ABSTRACT

A device communicates with feature peers, associated with a network, to obtain information associated with the feature peers, and receives a customer packet. The device also determines, based on the feature peer information, which of the feature peers support a feature associated with the customer packet, and selects, from the determined feature peers, a set of feature peers for the customer packet to traverse. The device further associates, with the customer packet, an additional packet used for delivering the feature associated with the customer packet, and forwards the customer packet and the additional packet to one of the feature peers in the selected set of feature peers.

23 Claims, 11 Drawing Sheets

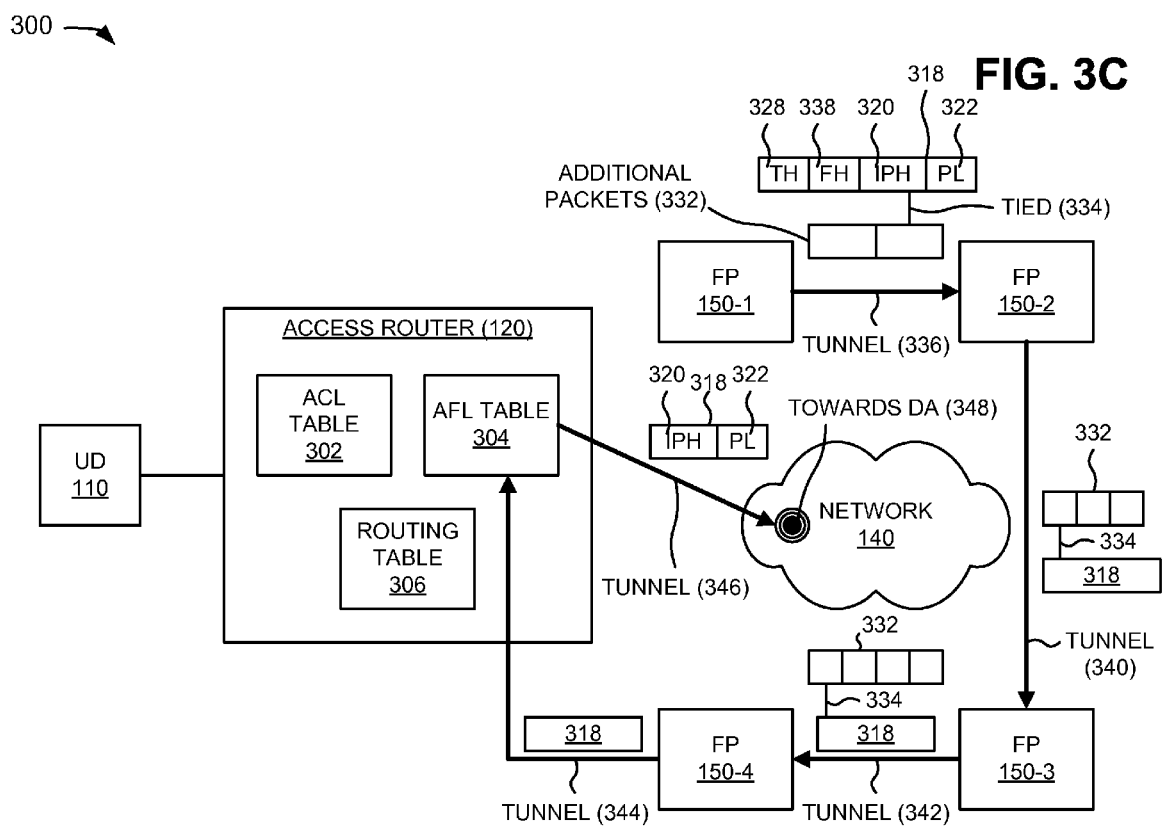

650 ⟶

FEATURE DELIVERY PACKETS FOR PEER-TO-PEER BASED FEATURE NETWORK

BACKGROUND

Some networks (e.g., telecommunications networks, the Internet, etc.) provide packet and/or content forwarding services and/or features. Examples of such packet/content forwarding services/features include content-related services (e.g., voice, audio, and/or video transcoding; bridging; replication; etc.); security-related services (e.g., network-based firewalls and/or application layer gateways; intrusion detection, prevention, and/or mitigation; denial of service detection, prevention, and/or mitigation; etc.); flow, rate, and quality of service (QoS)-related services (e.g., metering; policing; shaping; scheduling; coordination with higher-level signaling, policy, and configuration; etc.); accounting-related services (e.g., usage cap metering, notification, and/or enforcement; billing; etc.); administrative-related services (e.g., selective packet set capture, replication, redirection, and/or blocking; packet inspection; etc.); etc.

Such packet/content forwarding services/features may be managed via a "star" or "flower" network centered on a router (or feature switch). In the star/flower arrangement, traffic to/from a user (e.g., of a service or feature) is directed into a set of feature peers by the router/feature switch. Such an arrangement may require configuration of the router, use of tunnels, and load balancing, and may result in sub-optimal performance.

In one exemplary star/flower arrangement, a network management system (NMS) provisions an access control list (ACL) (e.g., of an access router) to map customer packets to routing logic, and provisions a routing table (e.g., of the access router) to determine mapping of a feature chain to a sequence of tunnels associated with a server for each (set of) features. The NMS also provisions feature servers with tunnel and subscriber information consistent with the provisioning of the access router. The access router determines data network information (e.g., Internet protocol (IP) interior gateway protocol (IGP)/border gateway protocol (BGP), virtual private network (VPN) multiprotocol (MP)-BGP, Ethernet address resolution protocol (ARP), etc.), and receives a packet from a customer (e.g., from a device associated with the customer). The access router uses the ACL to determine that the packet includes subscribed to features and directs the packet to the routing table to determine a tunnel next hop associated with a server for a first feature. The first feature server returns the packet to the access router. The access router then uses the routing table to sequence the packet through a chain of tunnels configured to reach each feature server in the chain, which then return the packets to the same access router, as configured by the NMS. Finally, the access router also uses the routing table to determine when the packet has exited from the last feature server in the chain, to decapsulate the packet from the tunnel, and to direct the packet to an original destination address. The access router then forwards the packet, via the data network, towards the destination address. A similar process occurs in the reverse direction for a packet received from the network (e.g., the Internet) that is destined for a particular subscriber.

However, the star/flower arrangement is expensive because, although it requires no changes to the software and/or hardware of the access router, the routers and switches are traversed twice between each feature server and the access router that connects to a user. In the star/flower arrangement, there needs to be a tunnel for each feature server per feature chain since a tunnel identification (ID) determines a next feature server or exit to the data network. Furthermore, the star/flower arrangement can increase latency if the feature servers are not near the access router that connects to the user. The star/flower arrangement requires a static configuration, in the router, of tunnel IDs and next hops; is not resilient (e.g., load balancing across the feature servers requires reconfiguration); and makes it difficult to represent more complex feature topologies than a chain topology.

Packet/content forwarding services/features may also be managed via a service header-based routing arrangement. In one exemplary service header-based routing arrangement, an access router registers with a service broker, and the service broker provisions an ACL (e.g., of the access router) to map customer packets to a service routing function (e.g., associated with the access router). The service broker provisions service nodes with service header, tunnel, network, and subscriber information consistent with provisioning of the service routing function for the access router in the network. The access router determines data network information (e.g., IP IGP/BGP, VPN MP-BGP, Ethernet ARP, etc.), and receives a packet from a customer (e.g., from a device associated with the customer). The access router uses the ACL to determine that the packet includes subscribed to services and directs the packet to the service routing function. The service routing function uses local configuration and packet information to determine a service header to be inserted, encapsulates this within a tunnel header, and forwards the packet to a first service node over the tunnel. The service node decapsulates the packet from the tunnel, reviews the service header and configured information from the service broker to determine an outgoing tunnel, and forwards the packet to the next service node. Eventually, the packet returns to the access router that originally received the packet (e.g., in the case where a service topology is a chain). The service routing function (e.g., of the access router) decapsulates the packet from the tunnel, examines the service header, and determines that the next step is forwarding. The access router then forwards the packet, via the data network, toward a destination address. A similar process occurs in the reverse direction for a packet received from the network (e.g., the Internet) that is destined for a particular subscriber.

The star/flower arrangement and the service header-based routing arrangement require expensive changes to the software and/or hardware of the access router in order to implement the service header insertion and processing. The service header-based routing arrangement relies on a centralized service broker to determine, download, and monitor state, and to optimize and load balance service node level routing across what could grow to be a very large set of service nodes. Centralization may limit a convergence time and responsiveness to change associated with the arrangement. Furthermore, the service header-based routing arrangement requires fault detection and restoration performance to be determined by the centralized service broker, and may not be implemented across more than one service provider. Finally, the service header-based routing arrangement requires use of long headers in packets, which may exceed maximum transmission unit (MTU) limitations on the size of headers in packets.

BRIEF DESCRIPTION OF THE DRAWINGS

FIGS. 3A-3C are diagrams of exemplary interactions among components of an exemplary portion of the network depicted in FIG. 1;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may include systems and/or methods that may provide feature delivery packets for a peer-to-peer based feature network. For example, in one implementation, a feature peer (e.g., a server that provides features and/or services, such as content-related services, security-related services, etc.) may communicate with other feature peers to obtain information associated with the other feature peers, which may or may not be associated with a received packet (e.g., from a user or customer). The feature peer may determine, based on the feature peer information, which of the other feature peers can support a feature associated with the customer packet. The feature peer may select a set of the other feature peers, from the determined other feature peers, for the customer packet to traverse. The feature peer may associate, with the customer packet, an additional packet that may be used for the delivery of features and may not be delivered to a destination address associated with the customer packet. The feature peer may add a feature header to the customer packet to create a modified customer packet, and may forward, based on the feature header, the modified customer packet to one of the feature peers in the set of other feature peers.

As used herein, the terms "user," "customer," and "subscriber," are intended to be broadly interpreted to include a user device and/or a user application or a user of a user device and/or a user application. A user application may include any operating system software and/or application software that make use of features and may be executed by a user device.

Figure 1:
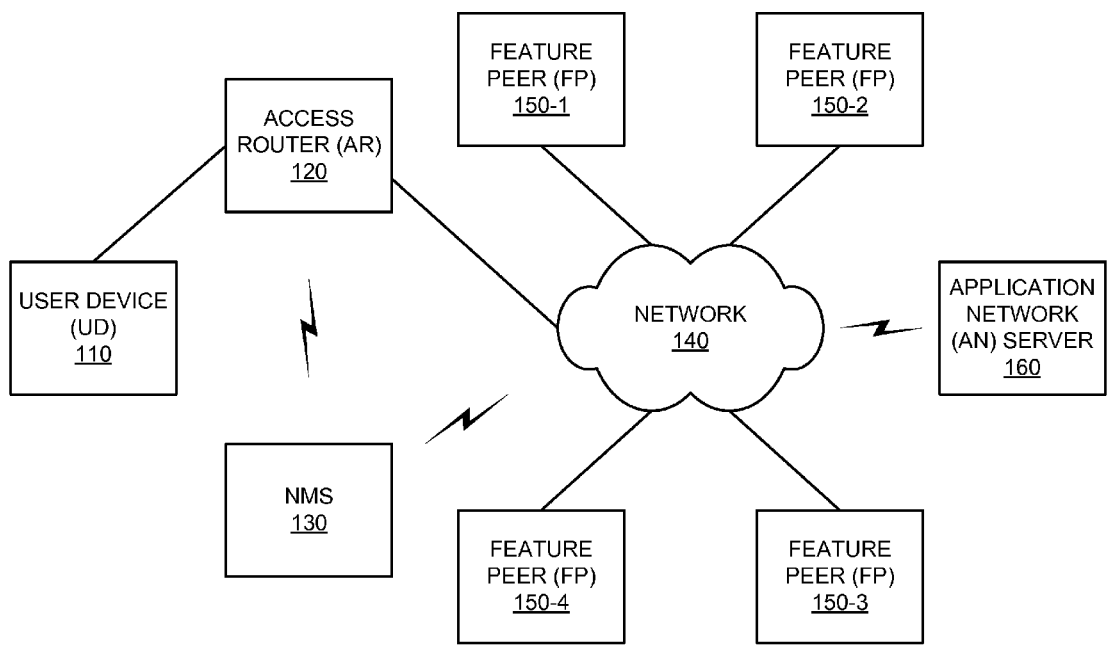
FIG. 1 is a diagram of an exemplary network in which systems and/or methods described herein may be implemented.

FIG. 1 depicts a diagram of an exemplary network 100 in which systems and/or methods described herein may be implemented. As illustrated, network 100 may include a user device (UD) 110, an access router (AR) 120, a network management system (NMS) 130, feature peers (FPs) 150-1, ..., 150-4 (referred to collectively as "feature peers 150" or singularly as "feature peer 150"), and an application network (AN) server 160 interconnected by a network 140. Components of network 100 may interconnect via wired and/or wireless connections. Four feature peers 150 and a single user device 110, access router 120, NMS 130, network 140, and AN server 160 have been illustrated in FIG. 1 for simplicity. In practice, there may be more user devices 110, access routers 120, NMSs 130, networks 140, feature peers 150, and/or AN servers 160. Also, in some instances, one or more of the components of network 100 may perform one or more functions described as being performed by another one or more of the components of network 100.

User device 110 may include a radiotelephone, a personal communications system (PCS) terminal (e.g., that may combine a cellular radiotelephone with data processing and data communications capabilities), a wireless telephone, a cellular telephone, a smart phone, a personal digital assistant (PDA) (e.g., that can include a radiotelephone, a pager, Internet/intranet access, etc.), a laptop computer (e.g., with a broadband air card), a personal computer, a landline telephone, or other types of computation or communication devices. In an exemplary implementation, user device 110 may include a device that is capable of accessing features and/or services (e.g., content-related services; security-related services; flow, rate, and QoS-related services; accounting-related services; administrative-related services; etc.) provided by the other components of network 100.

Access router 120 may include one or more data transfer devices (or network devices), such as a gateway, a router, a switch, a firewall, a network interface card (NIC), a hub, a bridge, a proxy server, an optical add-drop multiplexer (OADM), or some other type of device that processes and/or transfers data. In one exemplary implementation, access router 120 may enable user device 110 to access features and/or services (e.g., content-related services; security-related services; flow, rate, and QoS-related services; accounting-related services; administrative-related services; etc.) provided by feature peers 150.

NMS 130 may include one or more server devices, or other types of computation or communication devices, that gather, process, search, and/or provide information in a manner described herein. In an exemplary implementation, NMS 130 may monitor and administer a network, such as network 100.

Network 140 may include a local area network (LAN), a wide area network (WAN), a metropolitan area network (MAN), a telephone network, such as the Public Switched Telephone Network (PSTN), a cellular network, a Wi-Fi network, an intranet, a virtual private network (VPN), the Internet, an optical fiber (or fiber optic)-based network, or a combination of networks. In one exemplary implementation, network 140 may include a peer to peer (P2P)-based feature network that supports features and/or services provided by feature peers 150.

Feature peer 150 may include one or more server devices, or other types of computation or communication devices, that gather, process, search, and/or provide information in a manner described herein. In an exemplary implementation, feature peer 150 may communicate with other feature peers 150 to obtain information associated with the other feature peers 150, and may receive a customer packet (e.g., from user device 110 and via access router 120). Feature peer 150 may determine, based on the feature peer information, which of the other feature peers 150 can support a feature associated with the customer packet. Feature peer 150 may select a set of the other feature peers 150, from the determined other feature peers 150, for the customer packet to traverse. Feature peer 150 may associate, with the customer packet, an additional packet that may be used for the delivery of features and may not be delivered to a destination address associated with the customer packet. Feature peer 150 may add a feature header to the customer packet to create a modified customer packet, and may forward, based on the feature header, the modified customer packet to one of feature peers 150 in the set of other feature peers 150. Further details of feature peers 150 are provided below in connection with, for example, FIGS. 3A-4B.

AN server 160 may include one or more server devices, or other types of computation or communication devices, that gather, process, search, and/or provide information in a manner described herein. In an exemplary implementation, AN server 160 may communicate with feature peers 150, and may perform (e.g., on feature peers 150) functions, such as topology mapping to minimize cost and/or achieve optimal performance, and load balancing to balance loads on feature peers 150.

Although FIG. 1 shows exemplary components (e.g., devices) of network 100, in other implementations, network 100 may contain fewer, different, differently arranged, or additional components than depicted in FIG. 1.

Figure 2:
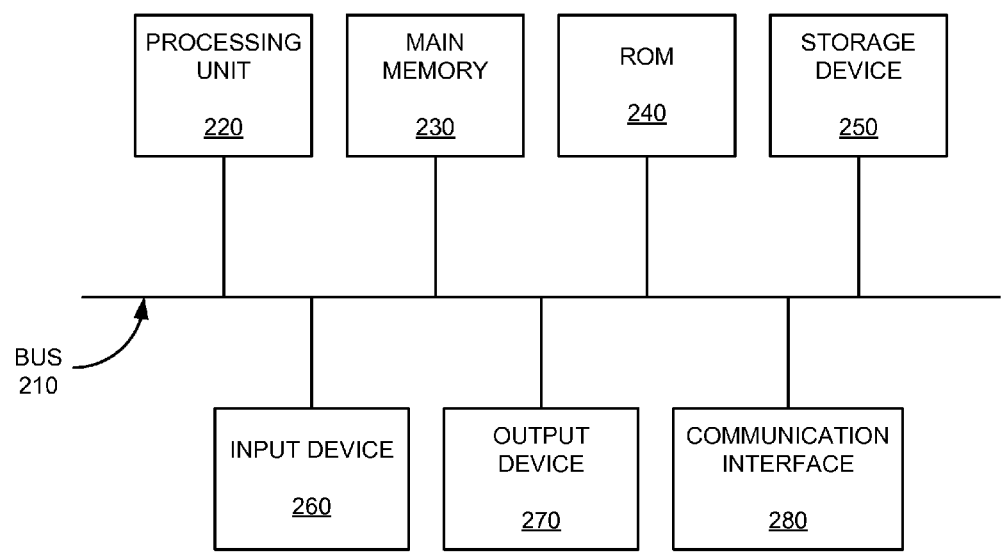
FIG. 2 is a diagram of exemplary components of a device that may correspond to one of the devices of the network depicted in FIG. 1.

FIG. 2 is an exemplary diagram of a device 200 that may correspond to one or more of user device 110, access router 120, NMS 130, feature peers 150, or AN server 160. As illustrated, device 200 may include a bus 210, a processing unit 220, a main memory 230, a read-only memory (ROM) 240, a storage device 250, an input device 260, an output device 270, and/or a communication interface 280. Bus 210 may include a path that permits communication among the components of device 200.

Processing unit 220 may include one or more processors, microprocessors, or other types of processing units that may interpret and execute instructions. Main memory 230 may include a random access memory (RAM) or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network.

As described herein, device 200 may perform certain operations in response to processing unit 220 executing software instructions contained in a computer-readable medium, such as main memory 230. A computer-readable medium may be defined as a physical or logical memory device. A logical memory device may include memory space within a single physical memory device or spread across multiple physical memory devices. The software instructions may be read into main memory 230 from another computer-readable medium, such as storage device 250, or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software. In one example, the software instructions may include any operating system software and/or application software that make use of features.

Although FIG. 2 shows exemplary components of device 200, in other implementations, device 200 may contain fewer, different, differently arranged, or additional components than depicted in FIG. 2. In still other implementations, one or more components of device 200 may perform one or more other tasks described as being performed by one or more other components of device 200.

Figure 3A:
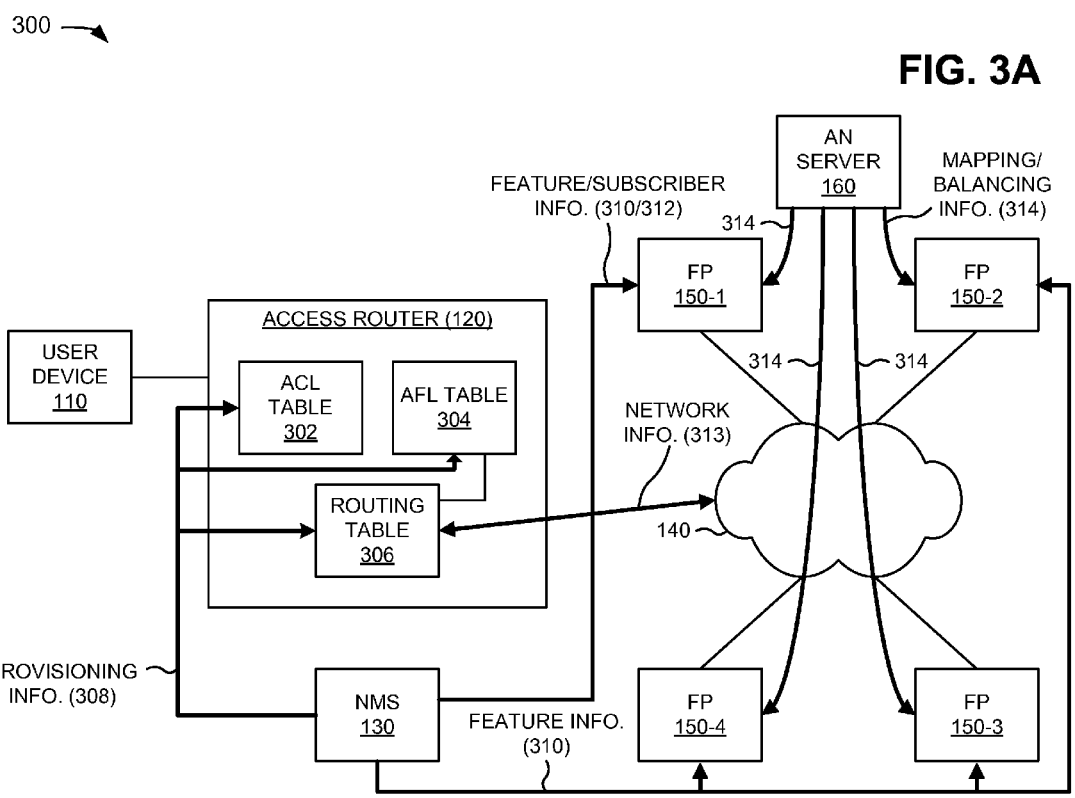
Figure 3B:
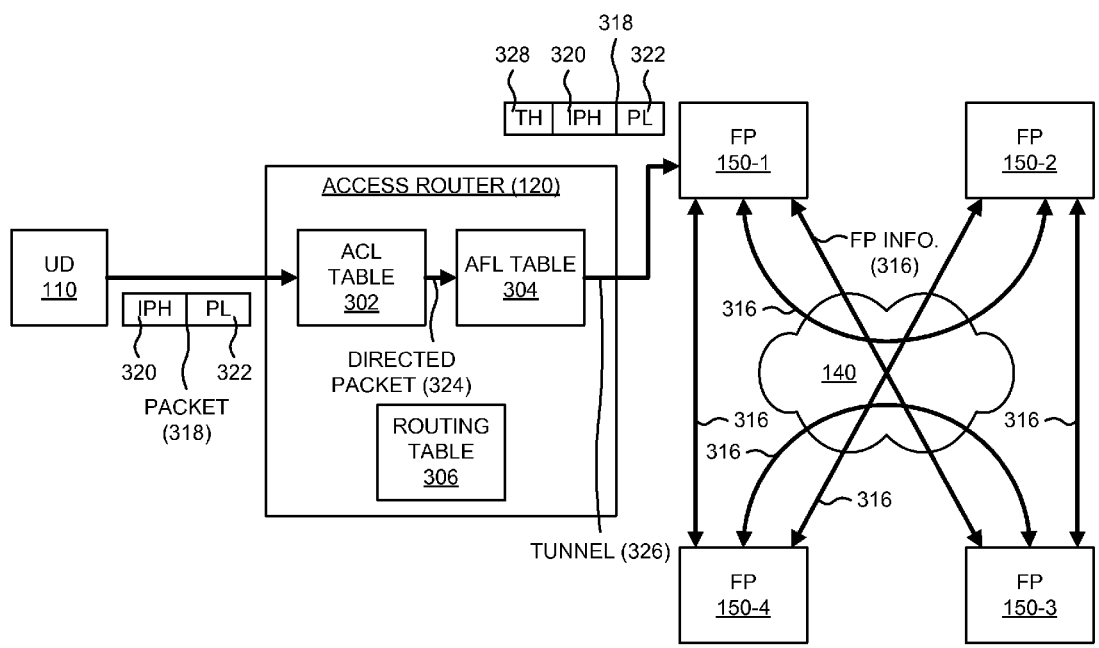

FIGS. 3A-3C depict diagrams of exemplary interactions among components of an exemplary portion 300 of network 100. As illustrated, exemplary network portion 300 may include user device 110, access router 120, NMS 130, network 140, feature peers 150, and AN server 160. User device 110, access router 120, NMS 130, network 140, feature peers 150, and/or AN server 160 may include the features described above in connection with, for example, FIGS. 1 and 2.

As further shown in FIG. 3A, access router 120 may include an access control list (ACL) table 302, an address forwarding lookup (AFL) table 304, and a routing table 306. In one exemplary implementation, ACL table 302, AFL table 304, and routing table 306 may be provided in one or more memory devices (e.g., main memory 230, ROM 240, and/or storage device 250) associated with access router 120.

ACL table 302 may include a table of entries that map an NMS-provisioned IP source address (SA) of a packet (e.g., received from user device 110) to a tunnel header associated with a tunnel on which the packet may be routed to a feature peer. In one example, ACL table 302 may include an IP SA field, a tunnel header field, and a variety of entries associated with the IP SA field and the tunnel header field. Further details of ACL table 302 are provided below in connection with, for example, FIG. 4A.

AFL table 304 may include a table of entries that map an IP destination address (DA) of a packet (e.g., received from network 140) with a next hop (e.g., device) to which the packet may be routed. In one example, AFL table 304 may include an IP DA field, a next hop field, and a variety of entries associated with the IP DA field and the next hop field. Further details of AFL table 304 are provided below in connection with, for example, FIGS. 4A and 4B.

Routing table 306 may include a table of entries that provide routing information for a packet received by access router 120 (e.g., from user device 110). In one example, routing table 306 (e.g., via AFL table 304) may be configured by NMS 130 to forward a packet on specific tunnel (e.g., using a tunnel header) to a first feature peer (e.g., feature peer 150-1). In another example, routing table 306 may be used to automatically discover addresses and next hops of feature peers and to automatically populate AFL table 304.

As further shown in FIG. 3A, NMS 130 may provide provisioning information 308 to ACL table 302, AFL table 304, and routing table 306. Provisioning information 308 may include information that enables access router 120 to handle packets received from user device 110 and/or provided to user device 110. In one example, provisioning information 308 may instruct ACL table 302 to map customer packets (e.g., received from an SA received from user device 110) to AFL table 304 using information obtained from routing table 306. AFL table 304 and routing table 306 may include a mapping to a tunnel for a first feature peer 150 if the customer subscribes to a peer-to-peer based feature network forwarding service (e.g., provided by network 100).

NMS 130 may provision feature peers 150 with feature information 310 and may provision a first feature peer (e.g., feature peer 150-1) with feature information 310 and subscriber information 312. Feature information 310 may include feature software (e.g., software that enables feature peers 150 to provide features and/or services, such as content-related services; security-related services; flow, rate, and QoS-related services; accounting-related services; administrative-related services; etc.); a feature net representation (e.g., a graph of feature peers 150 through which a packet may be routed); registration information; authentication information; load balancing and backup feature peer information; etc. Subscriber information 312 may include information associated with subscribers to features and/or services (e.g., content-related services, security-related services, etc.) provided by network 100. NMS 130 may periodically provide feature information 310 to feature peers 150 or may provide feature information 310 to feature peers 150 based on conditions (e.g., in response to a trigger) associated with network 140 and/or feature peers 150.

As further shown in FIG. 3A, routing table 306 of access router 120 may retrieve network routing protocol information 313 from network 140. Network information 313 may include IP IGP/BGP information, VPN MP-BGP information, Ethernet ARP information, etc. associated with network 140. Routing table 306 may use network information 313 to automatically populate AFL table 304 with forwarding information. In this way, information about a change in network topology related to feature peers 150 (e.g., a routing metric, a routing preference, or a failure may be used to automatically update forwarding information). AN server 160 may provide mapping/balancing information 314 to feature peers 150. Mapping/balancing information 314 may include information that provides topology mapping for feature peers 150 (e.g., to minimize cost and achieve optimal performance), and information that enables loads on feature peers 150 to be balanced so that one or more feature peers 150 do not become overloaded (e.g., with traffic). An alternative to communication with a logically centralized AN server 160 may include using pairs of feature servers to communicate load and active status amongst smaller sets of nodes to improve convergence time (e.g., using the procedure depicted in FIG. 3B).

As shown in FIG. 3B, feature peers 150 may communicate with each other to provide feature peer information 316 to other feature peers 150. Feature peer information 316 may include identification information; load information; path information; active/inactive status information; session signaling (e.g., signaling message packets 318 communicated between other parties (e.g., a session initiation protocol (SIP) user agent and a SIP server) intercepted for processing by a feature peer, and/or signaling provided between feature peers 150 during provisioning of packet 318); policy information (e.g., information associated with policies, such as usage policies, bandwidth allocations, etc.); database information (e.g., information contained in databases of feature peers 150, sizes of such databases, etc.); etc. associated with feature peers 150; and subscriber information (e.g., information associated with customers or subscribers to peer-to-peer based feature network forwarding). Feature peer information 316 may enable feature peers 150 to define a set of feature net logic (e.g., a set of feature peers 150) that may be dynamically determined and self correcting. In one exemplary implementation, feature peers 150 may communicate with each other using distributed hash tables (DHTs) to locate appropriate feature peers 150 based on a key (e.g., provided via feature peer information 316) that includes a feature peer ID, a subscriber ID range, feature information, a customer ID, IP source/destination addresses, etc. In another exemplary implementation, feature peers 150 may use P2P communication to provide continuously updated subscriber and feature related information that need not be forwarded via a packet header.

As further shown in FIG. 3B, a packet 318 from a customer (e.g., user device 110) may be provided to access router 120 (e.g., to ACL table 302 of access router 120). Packet 318 may include an IP header (IPH) 320 and a payload (PL) 322. IPH 320 may provide an address associated with user device 110. PL 322 may include information associated with features and/or services (e.g., content-related services, security-related services, flow, rate, and QoS-related services, accounting-related services, administrative-related services, etc.) provided by feature peers 150. ACL table 302 may receive packet 318, may determine that packet 318 is associated with subscribed to services and/or features, and may direct packet 318 to AFL table 304, as indicated by reference number 324.

AFL table 304 may be configured (e.g., via provisioning information 308) by NMS 130 to forward a packet on a specific tunnel 326 (e.g., using a tunnel header) to a first feature peer (e.g., feature peer 150-1) or may be automatically configured by routing table 306. AFL table 304 may provide a tunnel header 328 (e.g., which defines tunnel 326 to feature peer 150-1) in packet 318, and may forward packet 318, (e.g., using tunnel header 328) along tunnel 326 to feature peer 150-1. In one exemplary implementation, routing table 306 operating in conjunction with AFL table 304 may utilize mechanisms (e.g., anycast mechanisms, link aggregation groups (LAGs)) for providing resiliency and load balancing to feature peers 150. Feature peer 150-1 may receive packet 318.

With reference to FIG. 3C, feature peer 150-1 may determine (e.g., based on feature peer information 316) which of feature peers 150-2, 150-3, and 150-4 can support a feature associated with packet 318 (e.g., a feature set forth in PL 322 of packet 318). Feature peer 150-1 may determine subscriber information associated with packet 318, and may select a set of feature peers 150 (e.g., from feature peers 150 determined to support the feature associated with packet 318) for packet 318 to traverse. In one exemplary implementation, feature peer 150-1 may rank feature peers 150, determined to support the feature associated with packet 318, based on feature peer information 316. For example, feature peer 150-1 may rank feature peers 150 with smaller loads higher than feature peers 150 with larger loads. Feature peer 150-1 may select the set of feature peers 150 (e.g., from the ranked feature peers 150 determined to support the feature associated with packet 318) based on the rankings Packet 318 may be provided to the other feature peers 150 in the set of feature peers 150, may be returned to access router 120, and/or may be forwarded on to its destination address (e.g., provided in network 140).

As further shown in FIG. 3C, in an exemplary implementation, feature peer 150-1 may provide one or more additional (e.g., "feature delivery") packets 332 with a set of one or more instances of packet 318. Additional packets 332 may include information that may be used by one or more other feature peers 150 to deliver a feature(s) associated with packet 318. This may be possible because each feature peer 150 may know an identity of other feature peers 150 in a feature net that is associated with the customer, as described below with reference to FIGS. 4A and 5. However, such information may not be delivered to the destination address (e.g., provided in network 140) of packet 318. Additional packets 332 may avoid the issue (e.g., provided in current routing arrangements) of using long headers in packet 318 (e.g., headers that exceed MTU limitations of packet 318). The information contained in additional packets 332 may include load information associated with feature peer 150-1 and/or other feature peers 150; unavailability information associated with feature peer 150-1 and/or other feature peers 150 (e.g., whether feature peer 150-1 and/or other feature peers 150 need to reboot in a particular time period); security problem information (e.g., whether packet 318 includes security problems, such as a virus, being associated with a hacker, etc.); information needed (e.g., by other feature peers 150) for downstream calculations (e.g., how long other feature peers 150 can support a feature(s) associated with packet 318); state information necessary to support a subscribed feature in a back-up feature peer (e.g., a number of packets sent/received for a metered or usage threshold type service); etc. Additional packets 332 may be associated with (or tied 334 to) a set of one or more instances of packet 318 via a customer identifier (ID), a customer IP address (e.g., an IP address of user device 110), or other information (e.g., identification of the set of instances of packet 318, for example, via transport protocol (e.g., TCP, RTP) sequence numbers) that may be used to determine a customer feature set associated with packet 110.

Feature peer 150-1 may alter a tunnel header (e.g., tunnel header 328) of packet 318. Tunnel header 328 may be altered to define a tunnel 336 to a next feature peer (e.g., feature peer 150-2) to which to provide packet 318. Feature peer 150-1 may modify packet 318 by adding a feature header 338 to packet 318, and may forward the modified packet 318 and additional packets 332 to feature peer 150-2 (e.g., via tunnel 336). Feature header 338 may include a feature net ID, the subscriber information associated with packet 318, an address associated with access router 120, etc. In an exemplary implementation, feature header 338 may be omitted from packet 318 and may be provided via additional packets 332. Alternatively, an abbreviated feature header 338 may be used that references additional packets 332. These implementations may further reduce the potential for packet 318 to include headers that exceed MTU limitations.

Feature peer 150-2 may receive the modified packet 318 and additional packets 332 from feature peer 150-1, and may decapsulate packet 318 from tunnel 336. Feature peer 150-2 may inspect feature header 338 and feature information 310 (e.g., provided by NMS 130 or by feature peer information 316) to determine feature processing options and a next feature peer (e.g., feature peer 150-3) to which to provide packet 318. Feature peer 150-2 may alter a tunnel header (e.g., tunnel header 328) of packet 318. Tunnel header 328 may be altered to define a tunnel 340 to the next feature peer (e.g., feature peer 150-3), and may be used to forward the modified packet 318 to feature peer 150-3 (e.g., via tunnel 340).

Feature peer 150-2 may modify additional packets 332 by providing additional information (e.g., creating packets) in additional packets 332. The additional information provided in additional packets 332 (e.g., by feature peer 150-2) may include information that may be used by other feature peers 150 to deliver a feature(s) associated with packet 318. However, such additional information may not be delivered to the destination address (e.g., provided in network 140) of packet 318. The additional information provided in additional packets 332 (e.g., by feature peer 150-2) may include load information associated with feature peer 150-2 and/or other feature peers 150; unavailability information associated with feature peer 150-2 and/or other feature peers 150 (e.g., whether feature peer 150-2 and/or other feature peers 150 need to reboot in a particular time period); security problem information (e.g., whether packet 318 includes security problems, such as a virus, being associated with a hacker, etc.); information needed (e.g., by other feature peers 150) for downstream calculations (e.g., how long other feature peers 150 can support a feature(s) associated with packet 318); feature state information; etc. The modified additional packets 332 may be forwarded to feature peer 150-3, along with the modified packet 318.

Feature peer 150-3 may receive the modified packet 318 and the modified additional packets 332 from feature peer 150-2, and may decapsulate packet 318 from tunnel 340. Feature peer 150-3 may inspect feature header 338 and feature information 310 (e.g., provided by NMS 130 or by feature peer information 316) to determine feature processing options and a next feature peer (e.g., feature peer 150-4) to which to provide packet 318. Feature peer 150-3 may alter a tunnel header (e.g., tunnel header 328) of packet 318. Tunnel header 328 may be altered to define a tunnel 342 to the next feature peer (e.g., feature peer 150-4), and may be used to forward the modified packet 318 to feature peer 150-4 (e.g., via tunnel 342).

Feature peer 150-3 may further modify additional packets 332 by providing additional information (e.g., creating packets) in additional packets 332. The additional information provided in additional packets 332 (e.g., by feature peer 150-3) may include information that may be used by other feature peers 150 to deliver a feature(s) associated with packet 318. However, such additional information may not be delivered to the destination address (e.g., provided in network 140) of packet 318. The additional information provided in additional packets 332 (e.g., by feature peer 150-3) may include load information associated with feature peer 150-3 and/or other feature peers 150; unavailability information associated with feature peer 150-3 and/or other feature peers 150 (e.g., whether feature peer 150-3 and/or other feature peers 150 need to reboot in a particular time period); security problem information (e.g., whether packet 318 includes security problems, such as a virus, being associated with a hacker, etc.); information needed (e.g., by other feature peers 150) for downstream calculations (e.g., how long other feature peers 150 can support a feature(s) associated with packet 318); state information; etc. The modified additional packets 332 may be forwarded to feature peer 150-4, along with the modified packet 318.

Feature peer 150-4 may receive the modified packet 318 and the modified additional packets 332 from feature peer 150-3, and may decapsulate packet 318 from tunnel 342. Feature peer 150-4 may inspect feature header 338 and feature information 310 (e.g., provided by NMS 130) to determine feature processing options. Feature peer 150-4 may determine that it is the last feature peer 150 in a feature graph (e.g., a path traversed by packet 318), and may determine that packet 318 is to be returned to its origination point (e.g., to access router 120, FIG. 3A). Feature peer 150-4 may use the address associated with access router 120 (e.g., as provided in feature header 338) to define a tunnel 344 to access router 120. Feature peer 150-4 may alter a tunnel header (e.g., tunnel header 328) of packet 318, and may remove feature header 338 from packet 318. Since feature peer 150-4 is the last feature peer 150, feature peer 150-4 may also remove additional packets 332 and their association with packet 318. Tunnel header 328 may be altered to define tunnel 344 to access router 120, and may be used to forward packet 318 to access router 120 (e.g., via tunnel 344).

Access router 120 (e.g., AFL table 304) may receive packet 318 from feature peer 150-4, and may decapsulate packet 318 from tunnel 344. AFL table 304 may use IPH 320 to determine a next hop for packet 318, and may forward (e.g., via a tunnel 346) packet 318 to a destination address associated with network 140, as indicated by reference number 348.

Although FIGS. 3A-3C depict a chain or loop feature graph (e.g., packet 318 travels via feature peers 150-1, 150-2, 150-3, and 150-4) for routing packet 318, in other exemplary implementations, different types of feature graphs may be used for routing packet 318 (e.g., a decision tree feature graph, a feature graph that traverses feature peers 150-1 and 150-4, etc.). In one exemplary implementation, packet 318 may not be returned to access router 120 for forwarding on to the destination address associated with network 140, but rather packet 318 may be forwarded (or may be dropped) by any of feature peers 150 (e.g., provided in the feature graph). Furthermore, although FIGS. 3A-3C depict packet 318 being provided by user device 110, the implementations described herein may be applied to a packet provided by network 140 and destined for user device 110. Alternatively, a copy of packet 318 may be created at one of feature peers 150 and may be processed separately.

Although FIGS. 3A-3C show exemplary components of network portion 300, in other implementations, network portion 300 may contain fewer, different, differently arranged, or additional components than depicted in FIGS. 3A-3C. In still other implementations, one or more components of network portion 300 may perform one or more other tasks described as being performed by one or more other components of network portion 300.

Figure 4A:
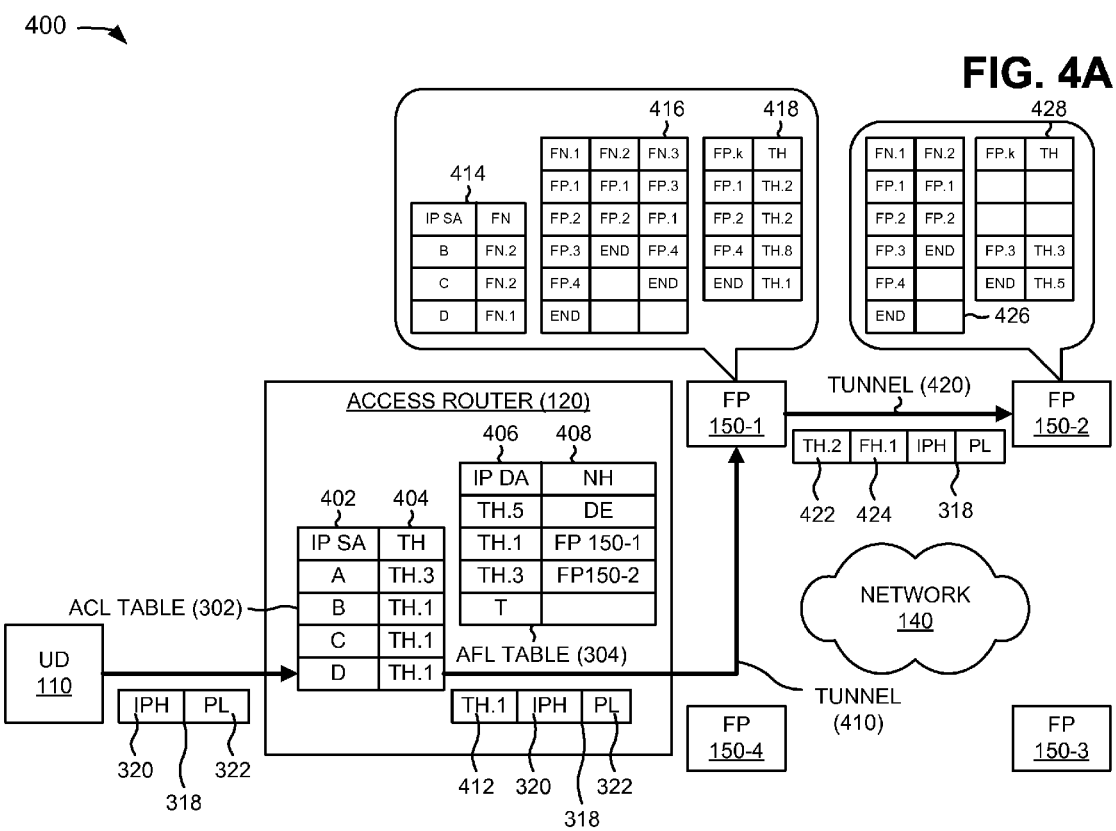
FIGS. 4A and 4B are diagrams of exemplary interactions among components of another exemplary portion of the network depicted in FIG. 1.
Figure 4B:
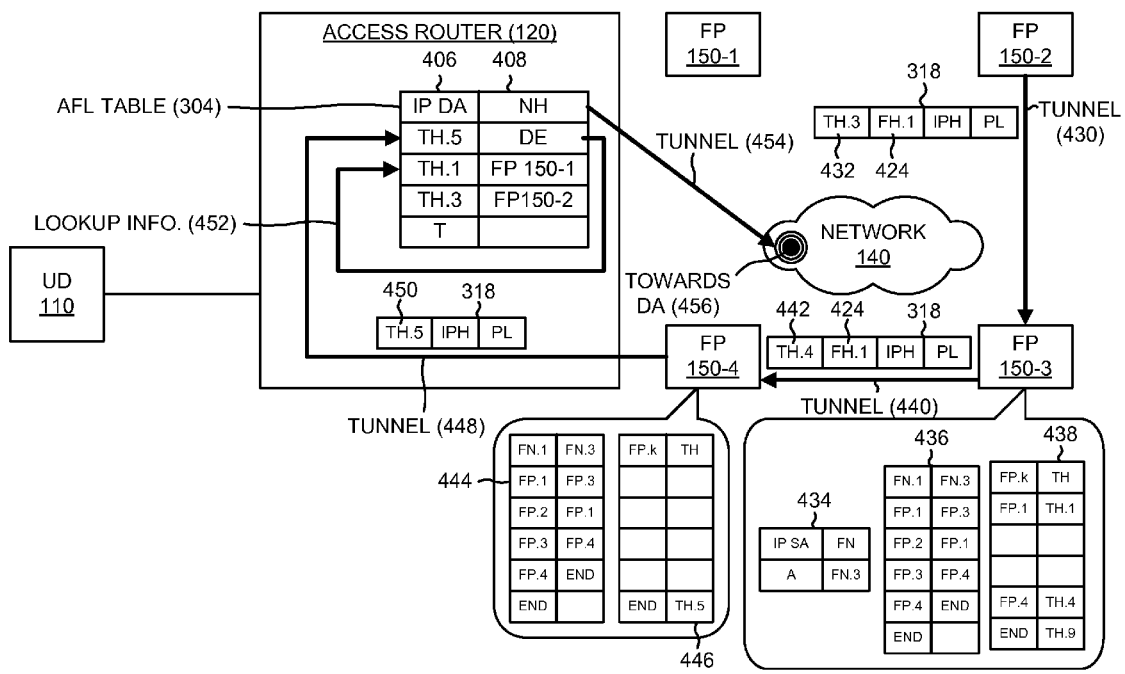

FIGS. 4A and 4B illustrate diagrams of exemplary interactions among components of another exemplary portion 400 of network 100. As illustrated, exemplary network portion 400 may include user device 110, access router 120 (e.g., including ACL table 302 and AFL table 304), network 140, and feature peers 150. User device 110, access router 120 (e.g., including ACL table 302 and AFL table 304), network 140, and/or feature peers 150 may include the features described above in connection with, for example, FIGS. 1-3C. ACL table 302 may include an IP source address (SA) field 402, a tunnel header (TH) field 404, and a variety of entries associated with IP SA field 402 and TH field 404. AFL table 304 may include an IP destination address (DA) field 406, a next hop (NH) field 408, and a variety of entries associated with IP DA field 406 and NH field 408.

As shown in FIG. 4A, user device 110 may provide packet 318 (e.g., including IPH 320 and PL 322) to ACL table 302 of access router 120. In one exemplary implementation, IPH 320 may include an IP source address of "D," and ACL table 302 may associate IP SA of "D" with a first tunnel header (TH.1) associated with feature peer 150-1. ACL table 302 may determine a tunnel 410 for packet 318 based on the IP SA (e.g., "D") of IPH 320 (or based on other parameters). Access router 120 may add a first tunnel header (TH.1) 412 to packet 318, and may forward packet 318 (e.g., based on first tunnel header 412) to feature peer 150-1 via tunnel 410, as determined via the "TH.1" IP DA entry in AFL table 304.

Feature peer 150-1 may receive packet 318 from tunnel 410, and may perform feature processing of packet 318. In one exemplary implementation, feature peer 150-1 may use distributed hash tables (DHTs) 414, 416, and 418 to determine how to process packet 318. In one example, a DHT function may not be performed for each packet, but may be performed in an event-driven manner when feature peer 150 net state changes (e.g., when a load crosses a threshold or when feature peer's 150 active/in active state changes). Event-driven DHT lookup results may then be locally cached for more efficient operation until a next event occurs.

DHT 414 may include an IP SA field, a feature net (FN) field, and a variety of entries associated with the IP SA field and the FN field. DHT 416 may include fields associated with each feature peer (FP.x) in a column for each feature net (e.g., FN.1, FN.2, ..., FN.k). DHT 418 may include an index of a specific feature peer that identifies one or more tunnel header (TH) fields, and to be used to forward a packet to the feature peers. If a feature peer is to replicate packets to multiple other feature peers, there may be a separate TH entry in DHT 418. In one example, feature peer 150-1 may perform a lookup of DHT 414 based on the IP SA (e.g., "D"), or other parameters, associated with packet 318, and may determine that the IP SA of "D" may be associated with a first feature network (FN.1).

Feature peer 150-1 may perform a lookup of DHT 416 based on the first feature network (FN.1) descriptor, and may determine a next feature peer (e.g., feature peer 150-2 (FP.2)) associated with the first feature network (FN.1). Feature peer 150-1 may use the determined next feature peer (e.g., FP.2) as an index for DHT 418 to determine the associated tunnel header (e.g., TH.2, per DHT 418) to define a tunnel 420 to feature peer 150-2 and to modify packet 318. For example, feature peer 150-1 may add a tunnel header 422 (e.g., TH.2) and a feature header 424 (e.g., FH.1) to packet 318. Tunnel header 422 may define tunnel 420. Feature header 424 may include the first feature network ID (e.g., FN.1), an address associated with access router 120, and subscriber information, and may be used by subsequent feature peers 150. Feature peer 150-1 may then route packet 318 to feature peer 150-2 via tunnel 420.

Feature peer 150-2 may receive packet 318 from tunnel 420, and may perform feature processing of packet 318. In one exemplary implementation, feature peer 150-2 may use event-driven DHTs 426 and 428 to determine how to process packet 318. DHT 426 may include fields associated with each feature peer (FP.x) in a column for each feature net (e.g., FN.1, FN.2, ..., FN.k). DHT 428 may include an index of a specific feature peer that identifies one or more tunnel header (TH) fields to be used to forward a packet to the feature peers. If a feature peer is to replicate packets to multiple other feature peers, there may be a separate TH entry in DHT 428. Feature peer 150-2 may perform a lookup of DHT 426 based on the first feature network (FN.1) descriptor, and may determine a next feature peer (e.g., feature peer 150-3 (FP.3)) associated with the first feature network (FN.1). Feature peer 150-2 may use the determined next feature peer (e.g., FP.3) as an index for DHT 428 to determine the associated tunnel header (e.g., TH.3, per DHT 428) to define a tunnel 430 (as shown in FIG. 4B) to feature peer 150-3 and to modify packet 318. For example, feature peer 150-2 may add a tunnel header 432 (e.g., TH.3 as shown in FIG. 4B), defining tunnel 430, to packet 318, and may or may not modify one or more fields associated with feature header 424 (FH.1). Feature peer 150-2 may then route packet 318 to feature peer 150-3 via tunnel 430.

As shown in FIG. 4B, feature peer 150-3 may receive packet 318 from tunnel 430, and may perform feature processing of packet 318. In one exemplary implementation, feature peer 150-3 may use event-driven DHTs 434, 436, and 438 to determine how to process packet 318. DHT 434 may include an IP SA field, a FN field, and a variety of entries associated with the IP SA field and the FN field. DHT 436 may include fields associated with each feature peer (FP.x) in a column for each feature net (e.g., FN.1, FN.2, ..., FN.k). DHT 438 may include an index of a specific feature peer that identifies one or more tunnel header (TH) fields to be used to forward a packet to the feature peers. If a feature peer is to replicate packets to multiple other feature peers, there may be a separate TH entry in DHT 438. Feature peer 150-3 may perform a lookup of DHT 436 based on the first feature network (FN.1) descriptor, and may determine a next feature peer (e.g., feature peer 150-4 (FP.4)) associated with the first feature network (FN.1). Feature peer 150-3 may use the determined next feature peer (e.g., FP.4) as an index for DHT 438 to determine the associated tunnel header (e.g., TH.4, per DHT 438) to define a tunnel 440 to feature peer 150-4 and to modify packet 318. For example, feature peer 150-3 may add a tunnel header 442 (e.g., TH.4), defining tunnel 440, to packet 318, and may or may not modify one or more fields associated with feature header 424 (FH.1). Feature peer 150-3 may then route packet 318 to feature peer 150-4 via tunnel 440.

Feature peer 150-4 may receive packet 318 from tunnel 440, and may perform feature processing of packet 318. In one exemplary implementation, feature peer 150-4 may use event-driven DHTs 444 and 446 to determine how to process packet 318. DHT 444 may include fields associated with each feature peer (FP.x) in a column for each feature net (e.g., FN.1, FN.2, ..., FN.k). DHT 446 may include an index of a specific feature peer that identifies one or more tunnel header (TH) fields to be used to forward a packet to the feature peers. If a feature peer is to replicate packets to multiple other feature peers, there may be a separate TH entry in DHT 446. Feature peer 150-4 may perform a lookup of DHT 444 based on the first feature network (FN.1) descriptor, and may determine a next feature peer (e.g., "END") associated with the first feature network (FN.1). Feature peer 150-3 may use the address associated with access router 120 (e.g., from feature header 424) as an index for DHT 446 to determine a tunnel header (e.g., TH.5, per DHT 446) that defines a tunnel 448 to access router 120. For example, feature peer 150-4 may add a tunnel header 450 (e.g., TH.5), defining tunnel 448, to packet 318, and may remove feature header 424 (FH.1) from packet 318. Feature peer 150-4 may then route packet 318 to access router 120 (e.g., to AFL table 304 of access router 120) via tunnel 448.

As shown in FIG. 4B, access router 120 (e.g., via AFL table 304) may identify packet 318 received from tunnel 448 as decapsulated (DE), and may utilize lookup information 452 to route packet 318 to its DA (e.g., based on IP DA field 406 and NH field 408). In one example, lookup information 452 may include a longest prefix match in network 140. AFL table 304 may use lookup information 452 to determine a next hop (e.g., a destination address in network 140) for packet 318, and may forward (e.g., via a tunnel 454) packet 318 to the destination address (DA) associated with network 140, as indicated by reference number 456.

Although FIGS. 4A and 4B show exemplary components of network portion 400, in other implementations, network portion 400 may contain fewer, different, differently arranged, or additional components than depicted in FIGS. 4A and 4B. In still other implementations, one or more components of network portion 400 may perform one or more other tasks described as being performed by one or more other components of network portion 400. For example, feature peers 150 may be used to distribute additional feature/subscriber information that may be omitted from feature header 424 of packet 318. Furthermore, although not shown in FIGS. 4A and 4B, a similar procedure may be used to implement a feature net for packets received from network 140 that are addressed to a specific user.

Figure 5:
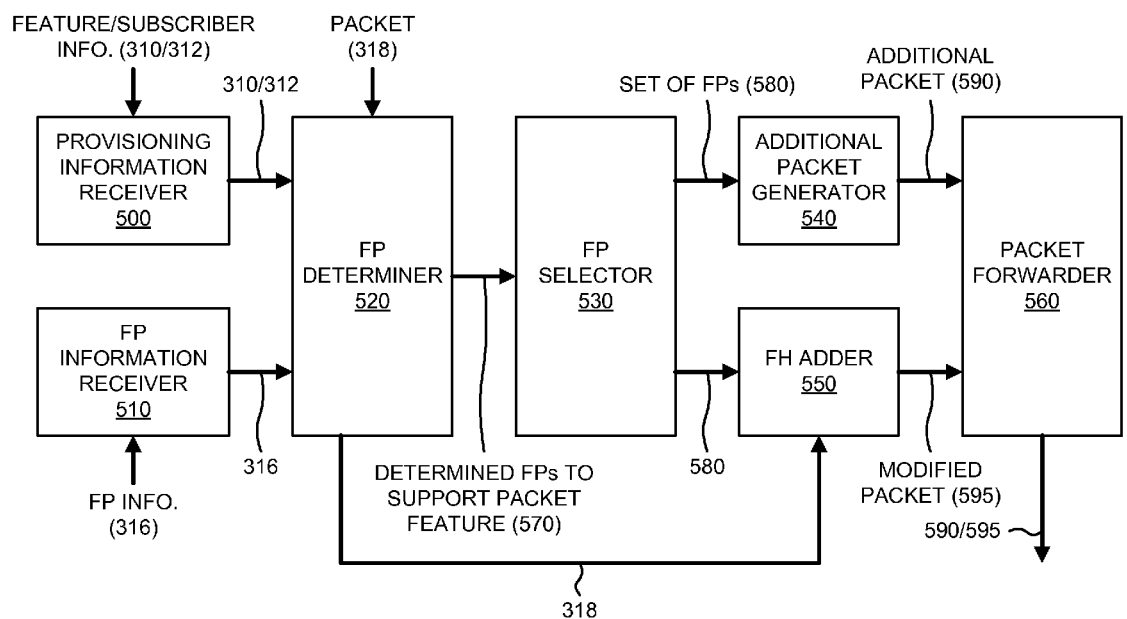
FIG. 5 is a diagram of exemplary functional components of a feature peer of the network depicted in FIG. 1.

FIG. 5 is a diagram of exemplary functional components of feature peer 150. As shown, feature peer 150 may include a provisioning information receiver 500, a feature peer (FP) information receiver 510, a feature peer (FP) determiner 520, a feature peer (FP) selector 530, an additional packet generator 540, a feature header (FH) adder 550, and a packet forwarder 560. In one example, the functionality described in connection with FIG. 5 may be performed by one or more of the components of device 200 (FIG. 2).

Provisioning information receiver 500 may include hardware or a combination of hardware and software that may receive feature information 310 and subscriber information 312 (e.g., from NMS 130). Provisioning information receiver 500 may periodically receive feature information 310 from NMS 130 or may receive feature information 310 from NMS 130 based on conditions (e.g., in response to a trigger) associated with network 140 and/or feature peer 150. Provisioning information receiver 500 may provide feature information 310 and subscriber information 312 to FP determiner 520.

FP information receiver 510 may include hardware or a combination of hardware and software that may receive feature peer information 316 (e.g., from other feature peers 150). Feature peer information 316 may enable feature peer 150 to define a set of feature net logic (e.g., a set of feature peers 150) that may be dynamically determined and self correcting. FP information receiver 510 may provide feature peer information 316 to FP determiner 520.

FP determiner 520 may include hardware or a combination of hardware and software that may receive feature information 310 and subscriber information 312 from provisioning information receiver 500, may receive feature peer information 316 from FP information receiver 510, and may receive packet 318. FP determiner 520 may determine (e.g., based on feature peer information 316) which other feature peers 150 can support a feature associated with packet 318 (e.g., a feature set forth in FH 338, IPH 320, and/or PL 322 of packet 318). FP determiner 520 may provide the determined feature peers 150 (e.g., which support a feature associated with packet 318) to FP selector, as indicated by reference number 570. For example, FP determiner 520 may populate feature net tables that include a chain of feature peers as shown in FIGS. 4A and 4B.

FP selector 530 may include hardware or a combination of hardware and software that may receive the determined feature peers 150 from FP determiner 520, may determine subscriber information associated with packet 318, and may select a set 580 of feature peers 150 (e.g., from feature peers 150 determined to support the feature associated with packet 318) for packet 318 to traverse. In one example, FP selector 530 may rank feature peers 150, determined to support the feature associated with packet 318, based on feature peer information 316. FP selector 530 may select the set of feature peers 150 (e.g., from the ranked feature peers 150 determined to support the feature associated with packet 318) based on the rankings FP selector 530 may provide set 580 of feature peers 150 to additional packet generator 540 and FH adder 550. In another example, FP selector 530 may determine what additional information may need to be sent to another set 580 of one or more feature peers 150.

Additional packet generator 540 may include hardware or a combination of hardware and software that may receive set 580 of feature peers 150 from FP selector 530. Additional packet generator 540 may generate an additional packet 590 destined for one or more feature peers 150 in the feature net. Additional packet 590 may include information that may be used by other feature peers 150 to deliver a feature(s) associated with packet 318. The information contained in additional packet 590 may include load information associated with feature peer 150 and/or other feature peers 150; unavailability information associated with feature peer 150 and/or other feature peers 150; information needed (e.g., by other feature peers 150) for downstream calculations; etc. Additional packet generator 540 may provide additional packet 590 to packet forwarder 560.

FH adder 550 may include hardware or a combination of hardware and software that may receive set 580 of feature peers 150 from FP selector 530, and may receive packet 318 from FP determiner 520. FH adder 550 may modify packet 318 by adding a feature header (e.g., feature header 338) to packet 318, and may provide modified packet 595 to packet forwarder 560.

Packet forwarder 560 may include hardware or a combination of hardware and software that may receive additional packet 590 from additional packet generator 540, and may receive modified packet 595 from FH adder 550. Packet forwarder 560 may associate additional packet 590 with modified packet 595 via a customer identifier (ID), a customer IP address (e.g., an IP address of user device 110), or other information that may be used to determine a customer associated with packet 110. Packet forwarder 560 may forward additional packet 590 and modified packet 595 to the other feature peers 150 in set 580 of feature peers 150, to access router 120, and/or to a destination address (e.g., provided in network 140) of modified packet 595. FIGS. 4A and 4B provide an exemplary packet forwarding operation in a simple chained feature (e.g., DHT 418 for FP-1).

Although FIG. 5 shows exemplary functional components of feature peer 150, in other implementations, feature peer 150 may contain fewer functional components, different functional components, differently arranged functional components, or additional functional components than depicted in FIG. 5. In still other implementations, one or more functional components of feature peer 150 may perform one or more other tasks described as being performed by one or more other functional components of feature peer 150.

In one exemplary implementation, information contained in event-driven DHTs 414/416 (e.g., provided in feature peer 150-1), event-driven DHT 426 (e.g., provided in feature peer 150-2), event-driven DHTs 434/436 (e.g., provided in feature peer 150-3), and event-driven DHT 444 (e.g., provided in feature peer 150-4) may be provided by and/or continuously updated by feature peer information 316 (FIG. 3B). Functions associated with feature peers 150 may change over time and in response to changing conditions and/or signaling. Thus, continuously updated feature peer information 316 may enable implementations described herein to dynamically update traversal of feature peers 150 by packet 318. Furthermore, in one exemplary implementation, information about each feature net (e.g., FN.1, FN.2, . . . , FN.k) may include partial ordering information (or no ordering information) such that traversal of feature peers 150 by packet 318 may occur in different orders or may change in response loads and/or failures associated with feature peers 150. In one example, traversal of feature peers 150 by packet 318 may occur in parallel and may include interactions between parallel streams. In an exemplary implementation, a distributed control plane may be dynamically executed between feature peers 150 to determine how to implement and/or adapt each feature net (e.g., FN.1, FN.2, . . . , FN.k).

In contrast to the star/flower arrangement and the service header-based routing arrangement, which require expensive changes to the software and/or hardware of the access router, implementations described herein do not require changes to the software/hardware of access router 120. Furthermore, the feature header (e.g., feature headers 338 and/or 424) described herein may include information distributed by DHT/P2P technology, possible in an event-driven manner to optimize efficiency. Convergence time, adaptation to changes, and ability to rapidly respond to changes, associated with implementations described herein, may be improved over centralized arrangements, such as the star/flower arrangement and the service header-based routing arrangement. Implementations described herein may combine DHT/P2P and network-aware routing using application layer topology optimization, and may function across multiple feature peers owned by different service providers.

Implementations described herein may be used to support a variety of services and/or features, such as content delivery network (CDN)-related features; caching, streaming server, and/or P2P native applications; encryption and/or decryption; changing wireless conditions (e.g., signal strength, location, privacy, bit rate, battery life, etc.); load and/or other information (e.g., local weather, traffic conditions, third party information, etc.); delivering service characteristics based on knowledge of user device 110; packet repair; VPN and/or Internet denial of service (DoS) detection and/or mitigation; sniffing packets and performing actions on packets; phishing detection; usage metering services; etc.

Figure 6:
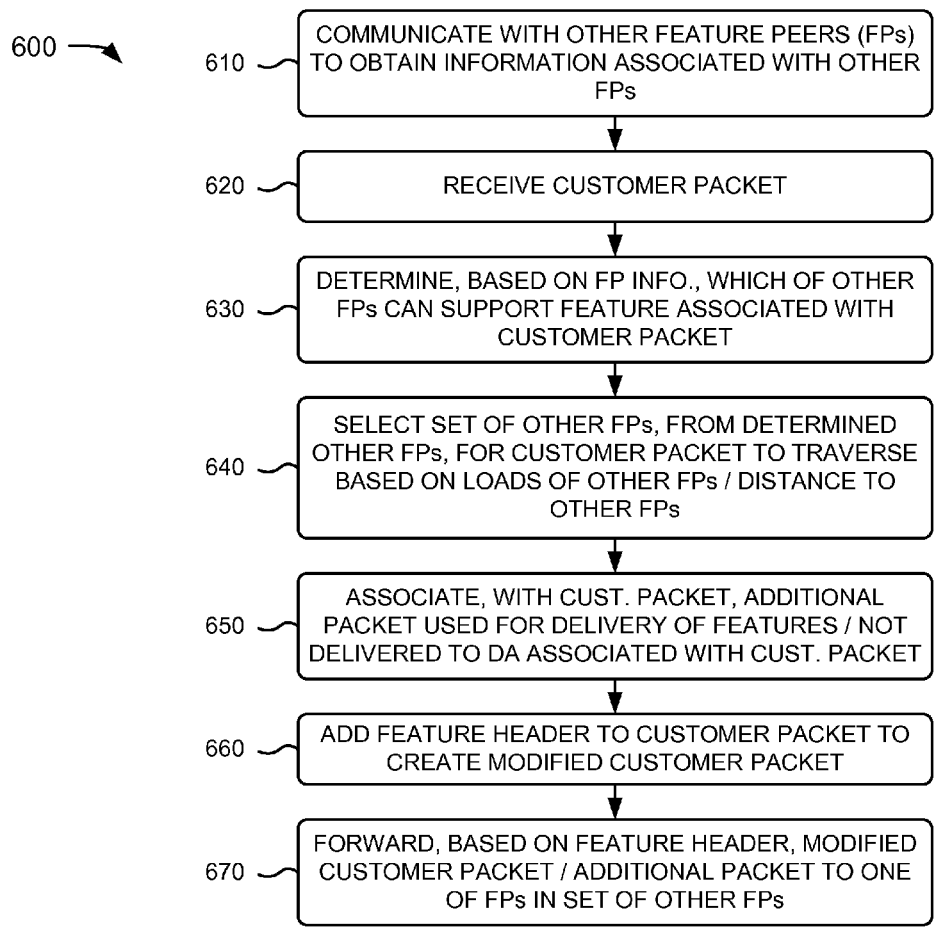
FIGS. 6-8 are flow charts of an exemplary process for providing feature delivery packets for a peer-to-peer based feature network according to implementations described herein.
Figure 7:
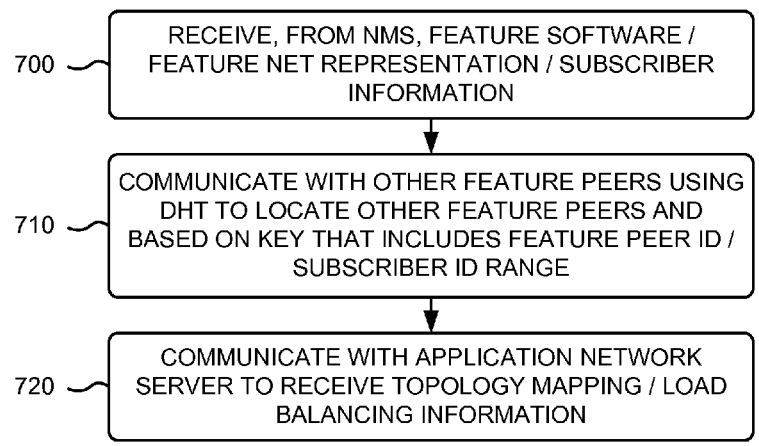
Figure 8:
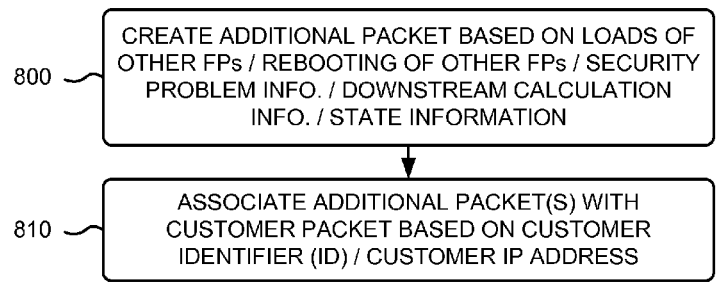

FIGS. 6-8 are flow charts of an exemplary process 600 for providing feature delivery packets for a peer-to-peer based feature network according to implementations described herein. In one implementation, process 600 may be performed by one of feature peers 150. In another implementation, some or all of process 600 may be performed by another device or group of devices, including or excluding one of feature peers 150.

As shown in FIG. 6, process 600 may include communicating with other feature peers to obtain information associated with the other feature peers (block 610), and receiving a customer packet (block 620). For example, in implementations described above in connection with FIGS. 3A and 3B, feature peers 150 may communicate with each other to provide feature peer information 316 to other feature peers 150. Feature peer information 316 may include identification information, load information, path information, etc. associated with feature peers 150, and subscriber information (e.g., information associated with customers or subscribers to peer-to-peer based feature network forwarding). Feature peer information 316 may enable feature peers 150 to define a set of feature net logic (e.g., a set of feature peers 150) that may be dynamically determined and self correcting. Packet 318 from a customer (e.g., user device 110) may be provided to access router 120 (e.g., to ACL table 302 of access router 120). ACL table 302 may receive packet 318, may determine that packet 318 is associated with subscribed to services and/or features, and may direct packet 318 to AFL table 304, as indicated by reference number 324. AFL table 304 may provide tunnel header 328 (e.g., which defines tunnel 326 to feature peer 150-1) in packet 318, and may forward packet 318, (e.g., using tunnel header 328) along tunnel 326 to feature peer 150-1. Feature peer 150-1 may receive packet 318.

As further shown in FIG. 6, process 600 may include determining which of the other feature peers can support a feature associated with the customer packet based on the feature peer information (block 630), and selecting a set of other feature peers, for the customer packet to traverse, from the determined other feature peers (block 640). For example, in implementations described above in connection with FIG. 3C, feature peer 150-1 may determine (e.g., based on feature peer information 316) which of feature peers 150-2, 150-3, and 150-4 can support a feature associated with packet 318 (e.g., a feature set forth in PL 322 of packet 318). Feature peer 150-1 may determine subscriber information associated with packet 318, and may select a set of feature peers 150 (e.g., from feature peers 150 determined to support the feature associated with packet 318) for packet 318 to traverse.

Returning to FIG. 6, process 600 may include associating, with the customer packet, an additional packet that may be used for delivery of features but may not be delivered to a destination address associated with the customer packet (block 650). For example, in implementations described above in connection with FIG. 3C, feature peer 150-1 may provide one or more additional packets 332 with packet 318. Additional packets 332 may include information that may be used by other feature peers 150 to deliver a feature(s) associated with packet 318. However, such information may not be delivered to the destination address (e.g., provided in network 140) of packet 318. Additional packets 332 may be associated with (or tied 334 to) packet 318. In other cases, a single additional packet may be tied to a set of many customer packets 318.

As further shown in FIG. 6, process 600 may include adding a feature header to the customer packet to create a modified customer packet (block 660), and forwarding the modified customer packet, based on the feature header, to one of the feature peers in the set of other feature peers (block 670). For example, in implementations described above in connection with FIG. 3C, feature peer 150-1 may add a tunnel header (e.g., tunnel header 328) to packet 318. Tunnel header 328 may define tunnel 336 to a next feature peer (e.g., feature peer 150-2) to which to provide packet 318. Feature peer 150-1 may modify packet 318 by adding feature header 338 to packet 318, and may forward the modified packet 318 to feature peer 150-2 (e.g., via tunnel 336). Packet 318 may be provided to the other feature peers 150 in the set of feature peers 150, may be returned to access router 120, and/or may be forwarded on to its destination address (e.g., provided in network 140).

Process block 610 may include the process blocks depicted in FIG. 7. As shown in FIG. 7, process block 610 may include receiving, from a network management system (NMS), feature software, a feature net representation, and subscriber information (block 700), communicating with the other feature peers using a distributed hash table (DHT) to locate other feature peers and based on a key that includes a feature peer identification (ID) and a subscriber ID range (block 710), and communicating with an application network server to receive topology mapping and load balancing information (block 720).

For example, in implementations described above in connection with FIG. 3A, NMS 130 may provision feature peers 150 with feature information 310 and may provision feature peer 150-1 with feature information 310 and subscriber information 312. Feature information 310 may include feature software, a feature net representation, authentication information, etc. AN server 160 may provide mapping/balancing information 314 to feature peers 150. Mapping/balancing information 314 may include information that provides topology mapping for feature peers 150 (e.g., to minimize cost and achieve optimal performance), and information that enables loads on feature peers 150 to be balanced so that one or more feature peers 150 do not become overloaded (e.g., with traffic). Feature peers 150 may communicate with each other using distributed hash tables (DHTs) to locate appropriate feature peers 150 based on a key (e.g., provided via feature peer information 316) that includes a feature peer ID, a subscriber ID range, feature information, a customer ID, IP source/destination addresses, etc.

Process block 650 may include the process blocks depicted in FIG. 8. As shown in FIG. 8, process block 650 may include creating the additional packet based on loads of the other feature peers, rebooting (or failure) of the other feature peers, security problem information, downstream calculation information, and/or state information (block 800), and associating the additional packet(s) with the customer packet based on a customer identifier (ID) and/or a customer IP address (block 810). For example, in implementations described above in connection with FIG. 3C, the information contained in additional packets 332 may include load information associated with feature peer 150-1 and/or other feature peers 150; unavailability information associated with feature peer 150-1 and/or other feature peers 150 (e.g., whether feature peer 150-1 and/or other feature peers 150 need to reboot in a particular time period); security problem information (e.g., whether packet 318 includes security problems, such as a virus, being associated with a hacker, etc.); information needed (e.g., by other feature peers 150) for downstream calculations (e.g., how long other feature peers 150 can support a feature(s) associated with packet 318); state information; etc. Additional packets 332 may be associated with packet 318 via a customer identifier (ID), a customer IP address (e.g., an IP address of user device 110), or other information that may be used to determine a customer associated with packet 110.

Implementations described herein may include systems and/or methods that may provide feature delivery packets for a peer-to-peer based feature network. For example, in one implementation, a feature peer may communicate with other feature peers to obtain information associated with the other feature peers, which may or may not be associated with a received packet (e.g., from a user or customer). The feature peer may determine, based on the feature peer information, which of the other feature peers can support a feature associated with the customer packet. The feature peer may select a set of the other feature peers, from the determined other feature peers, for the customer packet to traverse. The feature peer may associate, with the customer packet, an additional packet that may be used for the delivery of features and may not be delivered to a destination address associated with the customer packet. The feature peer may add a feature header to the customer packet to create a modified customer packet, and may forward, based on the feature header, the modified customer packet to one of the feature peers in the set of other feature peers.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with regard to FIGS. 6-8, the order of the blocks may be modified in other implementations. Further, non-dependent blocks may be performed in parallel.

It will be apparent that aspects, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code--it being understood that software and control hardware may be designed to implement the embodiments based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computing device-implemented method, comprising:
communicating, by the computing device, with feature peers, associated with a network, to locate, using a table, the feature peers and obtain information associated with the feature peers;
receiving, by the computing device, a customer packet;
determining, by the computing device and based on the feature peer information, which of the feature peers support a feature associated with the customer packet;
selecting, by the computing device and from the determined feature peers, a set of feature peers for the customer packet to traverse;
associating, by the computing device and with the customer packet, an additional packet used for delivering the feature associated with the customer packet; and
forwarding, by the computing device, the customer packet and the additional packet to one of the feature peers in the selected set of feature peers, where the set of feature peers delivers the customer packet to a destination address associated with the customer packet,
where forwarding the customer packet and the additional packet includes:
adding a feature header to the customer packet to create a modified customer packet; and
forwarding, based on the feature header, the modified customer packet to the one of the feature peers in the set of feature peers.

2. The computing device-implemented method of claim 1, where the additional packet is not delivered to the destination address associated with the customer packet.

3. The computing device-implemented method of claim 1, where the customer packet and the additional packet are provided to each of the feature peers in the set of feature peers.

4. The computing device-implemented method of claim 1, where a last feature peer, in the set of feature peers, provides the customer packet to an access router associated with the network, and where the access router forwards the customer packet to the destination address.

5. The computing device-implemented method of claim 1, where communicating with feature peers includes:
receiving, from a network management system (NMS), feature software, a feature net representation, and subscriber information; and
receiving, based on the feature peer information, topology mapping information and load balancing information associated with the feature peers.

6. The computing device-implemented method of claim 1, where communicating with feature peers includes:
communicating with the feature peers based on a key that includes feature peer identification information and subscriber identification information.

7. The computing device-implemented method of claim 1, where associating, with the customer packet, an additional packet includes:
creating the additional packet based on one or more of:
loads associated with the set of feature peers,
unavailability information associated with the set of feature peers,
security issues associated with the customer packet,
downstream calculation information associated with the set of feature peers, or
state information associated with the customer packet feature.

8. The computing device-implemented method of claim 1, where associating, with the customer packet, an additional packet includes:
associating the additional packet with the customer packet based on one of a customer identifier or a customer Internet protocol (IP) address associated with the customer packet.

9. The computing device-implemented method of claim 1, where the feature associated with the customer packet includes one or more of:
content-related services provided by the computing device and the set of feature peers,
security-related services provided by the computing device and the set of feature peers,
quality of service (QoS)-related services provided by the computing device and the set of feature peers,
accounting-related services provided by the computing device and the set of feature peers, or
administrative-related services provided by the computing device and the set of feature peers.

10. The computing device-implemented method of claim 1, where the additional packet includes a feature net identification, subscriber information, and an originating access router identification.

11. The computing device-implemented method of claim 1, where one feature peer, in the set of feature peers, one of:
forwards the customer packet to a destination address provided in the network, or
forwards the customer packet to a destination address associated with a customer.

12. A device, comprising:
a memory to store a plurality of instructions; and
a processor to execute instructions in the memory to:
communicate with feature peers, associated with a network, to locate, using a table, the feature peers and obtain information associated with the feature peers,
receive a customer packet,
determine, based on the feature peer information, which of the feature peers support a feature associated with the customer packet,
select, from the determined feature peers, a set of feature peers for the customer packet to traverse,
associate, with the customer packet, an additional packet used for delivering the feature associated with the customer packet, where the additional packet is not delivered to a destination address associated with the customer packet, and
forward the customer packet and the additional packet to one of the feature peers in the set of feature peers,
where the set of feature peers delivers the customer packet to a destination address associated with the customer packet,
where a last feature peer, in the set of feature peers, provides the customer packet to an access router associated with the network,
where the access router forwards the customer packet to the destination address, and
where, when forwarding the customer packet and the additional packet, the processor is further to execute instructions in the memory to:
add a feature header to the customer packet to create a modified customer packet, and
forward, based on the feature header, the modified customer packet to the one of the feature peers in the selected set of feature peers.

13. The device of claim 12, where, when selecting the set of feature peers, the processor is further to execute instructions in the memory to:
rank the determined feature peers based on the feature peer information, and select the set of feature peers from the determined feature peers based on the rankings of the determined feature peers.

14. The device of claim 12, where the customer packet and the additional packet are provided to each of the feature peers in the set of feature peers.

15. The device of claim 12, where, when communicating with feature peers, the processor is further to execute instructions in the memory to:
receive, from a network management system (NMS), feature software, a feature net representation, and subscriber information, and
receive, based on the feature peer information, topology mapping information and load balancing information associated with the feature peers.

16. The device of claim 12, where, when communicating with feature peers, the processor is further to execute instructions in the memory to:
communicate with the feature peers based on a key that includes feature peer identification information and subscriber identification information.

17. The device of claim 12, where, when associating, with the customer packet, an additional packet, the processor is further to execute instructions in the memory to:
create the additional packet based on one or more of:
loads associated with the set of feature peers,
unavailability information associated with the set of feature peers,
security issues associated with the customer packet,
downstream calculation information associated with the set of feature peers, or
state information associated with the customer packet feature.

18. The device of claim 12, where, when associating, with the customer packet, an additional packet, the processor is further to execute instructions in the memory to:
associate the additional packet with the customer packet based on one of a customer identifier or a customer Internet protocol (IP) address associated with the customer packet.

19. The device of claim 12, where the feature associated with the customer packet includes one or more of:
content-related services provided by the device and the set of feature peers,
security-related services provided by the device and the set of feature peers,
quality of service (QoS)-related services provided by device and the set of feature peers,
accounting-related services provided by the device and the set of feature peers, or
administrative-related services provided by the device and the set of feature peers.

20. The device of claim 12, where the additional packet includes a feature net identification, subscriber information, and an identification of the access router.

21. The device of claim 12, where one feature peer, in the set of feature peers, one of:
forwards the customer packet to a destination address provided in the network,
forwards the customer packet to a destination address associated with a customer, or
drops the customer packet before the customer packet reaches the destination address provided in the network.

22. The device of claim 12, where the feature peer information includes one or more of:
identification information associated with the feature peers,
load information associated with the feature peers,
path information associated with the feature peers,
subscriber information, or
state information associated with the customer packet feature.

23. A non-transitory computer-readable storage medium storing computer-executable program instructions which, when executed by a processor, perform a method comprising:
communicating with feature peers associated with a network, to locate, using a table, the feature peers and obtain information associated with the feature peers;
receiving a customer packet;
determining, based on the feature peer information, which of the feature peers support a feature associated with the customer packet;
selecting, from the determined feature peers, a set of feature peers for the customer packet to traverse;
adding a feature header to the customer packet to create a modified customer packet;
associating, with the modified customer packet, an additional packet used for delivering the feature associated with the customer packet; and
forwarding the modified customer packet and the additional packet to one of the feature peers in the selected set of feature peers, where the set of feature peers delivers the customer packet to a destination address associated with the customer packet.

\* \* \* \* \*